UNITED STATES PATENT OFFICE.

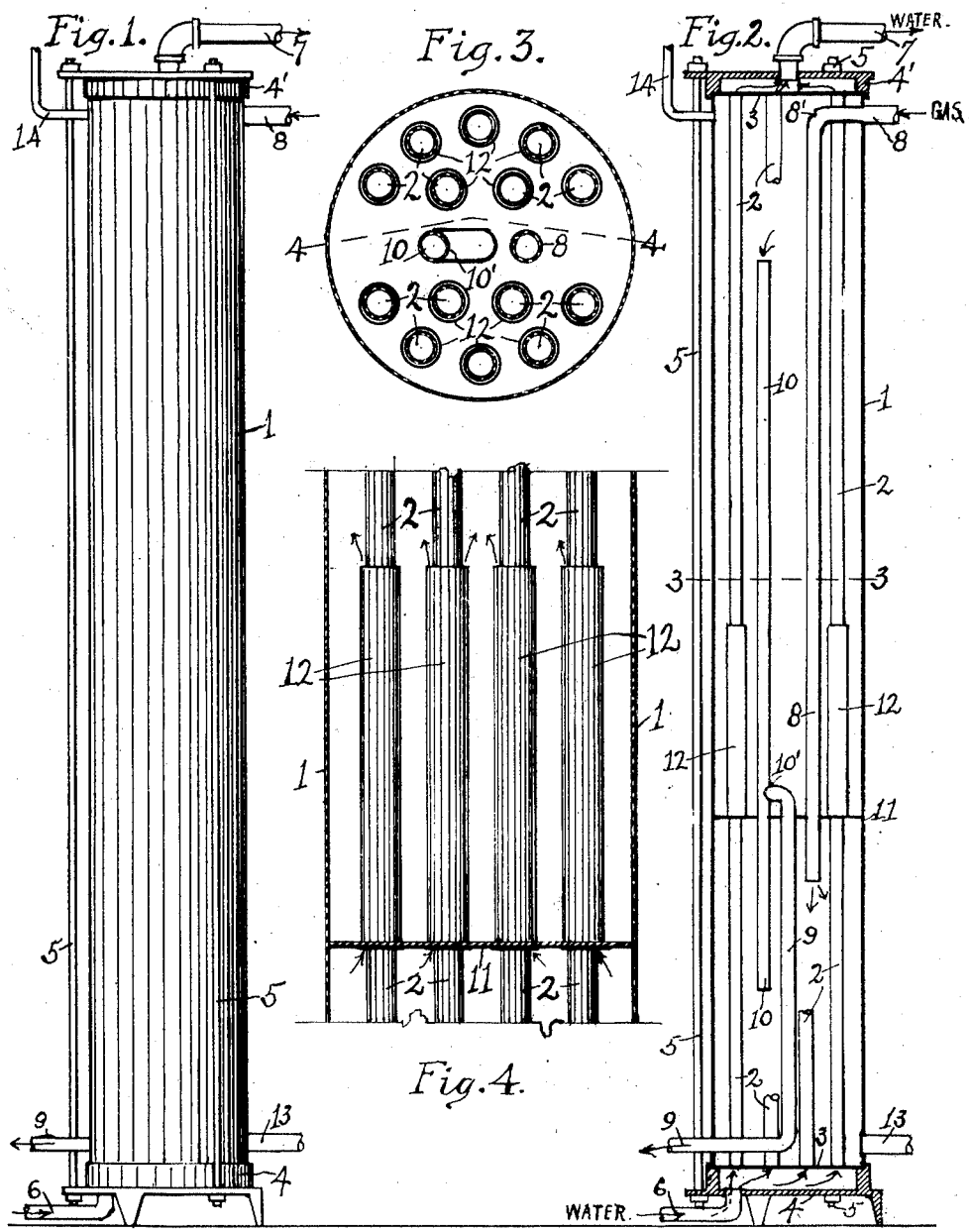

WILLIAM YOUNG, OF TACOMA, WASHINGTON.

CONDENSER-TANK FOR REFRIGERATING AND ICE-MAKING MACHINES.

1,349,746.  Specification of Letters Patent.  Patented Aug. 17, 1920.

Application filed February 1, 1919. Serial No. 274,403.

*To all whom it may concern:*

Be it known that I, WILLIAM YOUNG, a citizen of the United States, residing at the city of Tacoma, in the county of Pierce and State of Washington, have invented new and useful Improvements in Condenser-Tanks for Refrigerating and Ice-Making Machines, of which the following is a specification.

My invention relates to refrigerator condenser tanks in which ammonia gas is put under pressure and from which ammonia liquid is derived and distributed to expansion coils for refrigerating purposes.

The objects of my invention are, first, to provide within the condenser tank a lower and an upper inlet to the discharge pipe whereby the ammonia is allowed to pass into the expansion coils; and, second, to provide an oil separator within the condenser tank whereby the oil spray mixed with the ammonia gas may be separated therefrom and collected in the bottom of the tank for withdrawal.

I attain these objects by means of the device illustrated in the accompanying drawing in which:

Figure 1 is a side view of the exterior of a condenser tank with my improvements therein; Fig. 2 is a vertical section through the center of a condenser tank in which may be seen the new improvements I have invented. Fig. 3 is an enlarged cross section at 3—3, and Fig. 4 is vertical section at 4—4 to more clearly show the oil separating device.

Similar numerals refer to similar parts in the several views.

My improvement is within a common form of a cylindrical condenser tank 1, through which extends a number of water tubes 2—2. The ends of these tubes 2 are fixed air tight in the top and bottom end plates 3 of the tank. The tank ends are inclosed by water heads 4 and 4' held in place by the tension bolts 5—5. The water pipe 6 supplies water to the lower head 4 with an outlet pipe 7 leading from the upper head 4', the flow of water being controlled by suitable means to keep the contents of the tank cool.

One novel operative part of my invention comprises the gas inlet pipe 8 near the top of the tank and which is continued down inside the tank with its open discharge end below a baffle disk 11, hereinafter described; at a suitable distance from the bottom of the tank 1. The gas supply is designed to come from my automatic compressor described in a former patent application, but any form of compressor may be used in connection with the supply inlet. A back vent 8' in the inlet elbow of pipe 8, equalizes the pressure therein and prevents the liquid ammonia from flowing back into valve chambers of the compressor cylinder.

Another novel operative part is the outlet pipe 9 which extends from its outlet near the bottom up through the center of the tank where it is connected with a second upright pipe 10 at 10'. This pipe 10 is open at its upper and lower ends. The required amount of liquid ammonia to supply the refrigerating system having been placed within the tank before operating, the liquid ammonia will flow up through the lower open end of pipe 10 to the intersection 10' whence it flows down and out through pipe 9 from which it passes into the expansion coils where it is vaporized. It will now be observed, when the liquid ammonia has been discharged till the surface thereof sinks below the intersection 10', the gas will flow in through the upper open end of pipe 10 and down through the intersection 10' and out through pipe 9. This flow of gas will continue till the compressor recondenses sufficient gas within the tank to raise the liquid ammonia above intersection 10' when the flow of liquid ammonia will continue as before.

The gas supply coming into the condenser tank through pipe 8 is mixed with oil spray produced from the lubricant of the compressor mechanism. This mixing of vaporized oil with the ammonia gas requires an oil separator within the tank 1. I provide a separator by means of a baffle disk 11, located between the intersection 10', and the discharge end of the inlet pipe 8. This disk 11 is perforated with openings to let the water tubes 2—2 pass freely therethrough and in each of said openings is fixed a pipe sleeve 12 to encircle its respective water tube 2 and extend up a suitable distance leaving a thin circular space between. When the ammonia gas is discharged from pipe 8 the oil spray mixed therewith collects and settles to the bottom of the condenser tank 1, while the ammonia gas percolates up through the circular spaces between the pipe sleeves 12 and the water tubes 2 to the upper part of the tank 1. The ammonia gas is thus more readily cooled and condensed into liquid ammonia by contact with the water tubes 2. The gas discharged from pipe 8 rises to the disk 11 and percolates up through the circular spaces between the pipe sleeves 12 and the water tubes 2. The sleeves 12 are effective in collecting the oil not separated by gravity and remaining in the gas as it passes above the disk 11. The oil thus separated and collected in the bottom of the tank may be drawn off through the outlet pipe 13 and be again used.

The pipe extension 14 is designed for a pressure gage to be attached thereto.

Having described my invention, I claim:

1. In a refrigerating condenser tank having vertical water tubes therethrough, an outlet discharge pipe from said tank, an upright pipe having upper and lower openings connected with said outlet discharge pipe, an ammonia gas supply pipe with an outlet in said tank below said connection, of a vent into said supply pipe at its top end to equalize the gas pressure within said tank.

2. In a refrigerator condenser tank, a discharge pipe having two inlets from the tank, one of said inlets submerged in the ammonia liquid and the other in the ammonia gas above said ammonia liquid, and said discharge pipe connected between said two inlets with the outlet discharge pipe of said condenser tank.

3. In a refrigerator condenser tank having vertical water tubes therethrough, an outlet discharge pipe from said tank, an upright pipe having upper and lower openings connected with said outlet discharge pipe, an ammonia gas supply pipe with an outlet within said tank below said discharge pipe connection, of an oil separator comprising a baffle disk fixed within said tank and between said gas supply pipe outlet and said discharge pipe connection, said baffle disk having openings with loose fitting pipe sleeve extensions of suitable length above said baffle disk and around each of said water tubes as described.

WILLIAM YOUNG.